No. 894,875.
PATENTED AUG. 4, 1908.
A. V. BRYCE.
LOCKING NUT.
APPLICATION FILED SEPT. 16, 1907.
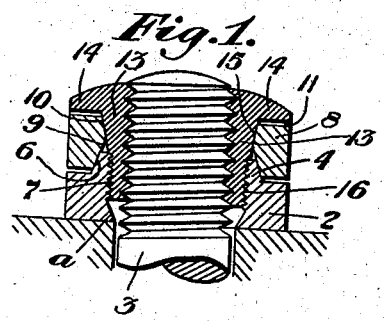
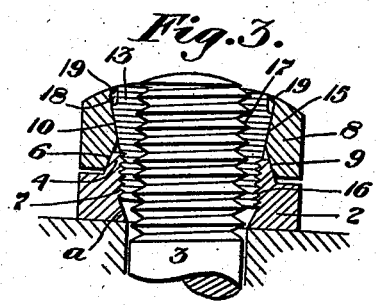
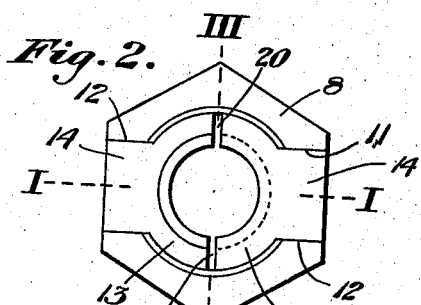
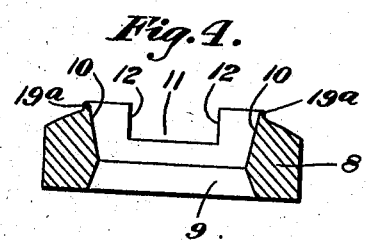
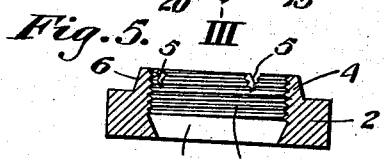
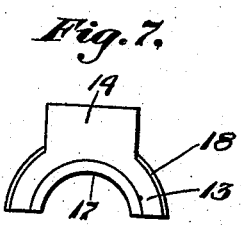
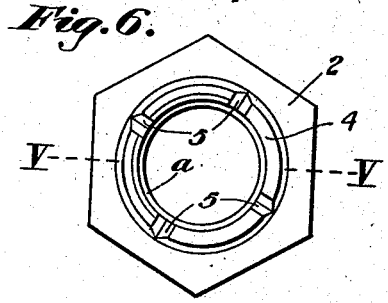
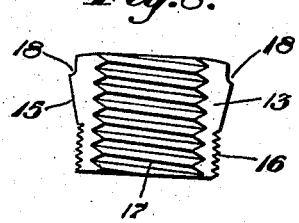
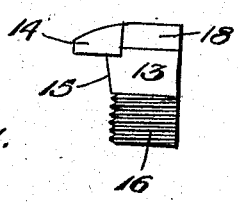
Witnesses:
Chas. S. Epley.
Fred Staub.
Inventor:
Andrew V. Bryce
by C. M. Clarke
his attorney.

UNITED STATES PATENT OFFICE.

ANDREW V. BRYCE, OF PITTSBURG, PENNSYLVANIA, ASSIGNOR TO INTER-STATE MANUFACTURING COMPANY, OF PITTSBURG, PENNSYLVANIA, A CORPORATION OF ARIZONA TERRITORY.

LOCKING-NUT.

No. 894,875.      Specification of Letters Patent.      Patented Aug. 4, 1908.

Application filed September 16, 1907. Serial No. 393,072.

*To all whom it may concern:*

Be it known that I, ANDREW V. BRYCE, a citizen of the United States, residing at Pittsburg, in the county of Allegheny and State of Pennsylvania, have invented certain new and useful Improvements in Locking-Nuts, of which the following is a specification, reference being had therein to the accompanying drawing.

My invention consists of an improvement in locking nuts for bolts, etc. of that class wherein a turning nut is provided with separable internally threaded tapered bushings adapted to engage the bolt under turning action of the nut and to gradually tighten upon it so as to prevent loosening.

The invention has for its object to provide a device of this character which shall be simple and efficient in construction, cheap to manufacture, so constructed that the nut and the contained bushings will be assembled and maintained in operative relation to each other without separation during shipment and handling, similar to the nut of a companion application filed herewith, and has in view to provide an additional or supplemental wedging or tightening nut, constructed in the manner and adapted to coöperate with the main nut in the manner hereinafter described.

Referring to the drawings: Figure 1 is a vertical sectional view showing the device secured upon the end of a threaded bolt, indicated by the section line I. I. of Fig. 2. Fig. 2 is a plan view of Fig. 1. Fig. 3 is a sectional view similar to Fig. 1 at right angles thereto, indicated by the section line III. III. of Fig. 2. Fig. 4 is a cross sectional detail view of the upper nut detached. Fig. 5 is a similar sectional view of the lower nut detached, indicated by the line V. V. of Fig. 6. Fig. 6 is a plan view of the lower nut. Figs. 7 8 and 9 are detail views of one of the bushings detached.

2 is the under nut, of any suitable form, either square or hexagon the middle portion of which is open for clearance of the bolt 3 and is provided with an annular upwardly extending exteriorly tapered wedge extension 4 divided at intervals by vertical cuts or divisions 5 of any suitable form so as to permit of a certain amount of resiliency, whereby the extension 4 may be forced inwardly in the manner hereinafter described. The outer tapered face 6 of said extension 4 is smooth as shown, while the inner annular walls are vertical and provided with the screw threads 7 adapted to engage the correspondingly threaded exterior terminals of the bolt-clamping bushing. At its lower portion, below the threads 7, the lower nut 2 is provided with an inwardly tapering annular wall *a* adapted to engage the lower terminals of the bushings and to wedge them inwardly against the bolt as the bushings are screwed down. The under face of the lower nut 2 is flat in order to make binding contact against the face of any element with which the bolt and nut is incorporated.

8 is the upper nut, also of any suitable form but preferably of the same exterior shape as the under nut 2 provided in its lower interior portion with a cavity having downwardly and outwardly tapering annular faces 9, corresponding to the degree of tapered faces 6 of the lower nut, and adapted to wedge the sectional tapered extension 4 inwardly around the bushings when the nut 8 and the assembled bushings are turned. The upper interior central cavity of nut 8 is confined within oppositely flaring tapered walls 10 as clearly shown in Fig. 4, conforming to the same degree of taper as that of the bushings. Nut 8 is provided at opposite sides at its upper portion with recesses 11 cut or formed in any suitable manner below the general upper surface of the nut and adapted to receive and engage by the shoulders 12, 12 a laterally projecting lug of each separate bushing at opposite sides, as clearly shown.

13, 13 are the bushings which, as shown, are double, provided with the said lugs 14, having the downwardly tapered exterior faces 15 terminating in straight threads 16 adapted to be engaged by threads 7 of the lower nut 2 and also provided with the main interior threads 17 for engagement with the threads of the bolt 3, as clearly shown in Figs. 1 and 3.

The upper portions of bushings 13 are recessed as at 18 so as to provide clearance for an inwardly projecting fin or lip 19 arranged around the opposite sides of upper nut 8, extending inwardly over the recesses 18 as shown, so as to prevent disengagement of the parts when assembled. The lip 19 is originally made in the form shown in Fig. 4 indicated by the numeral 19ª, whereby the upper tapered faces 10 extend continuously to the upper side of nut 8 and after the parts are assembled these lips 19ª are bent over into the position shown in Fig. 3 to engage and retain the bushings as stated. A convenient and economical method of turning the lips over is to first assemble the parts and then mingle a large number of them together in a "tumbling barrel" whereby the thin lips will be bent over into position by contact with the other nuts. Any desired method of turning them over however may be adopted and the invention is not necessarily limited in this respect.

The bushings 13 may be made in any suitable manner as by casting, with which method I have secured good results in practice, care being taken that the threads in the bushings are so arranged as to aline with each other at their terminals, for which purpose I make the bushings from different patterns so that when seated within the nuts 2 and 8 their threads will form practically one continuous thread both inside and outside, being interrupted at opposite sides only by the slight intervening space 20, as clearly shown in Fig. 2. The function of such space is that as the assembled nuts are secured around the bolt 3 upon the lower bearing seat, and further motion being imparted to the bushing, they will be fed downwardly upon the bolts and within nut 2 respectively by their threads, and will be drawn inwardly by reason of the tapered faces 10 and 15, and also by the supplemental binding action of extensions 4 wedged inwardly by tapered faces 9. When the lower edges of the bushings make contact with the tapered walls a the wedging action will be further increased, thus tightly binding the bushings to the bolts. It will be understood of course, that the degree of taper of the co-acting faces is purposely the same to insure a good bearing throughout the entire length of each co-acting element.

An especial advantage in the combination of the two nuts 2 and 8, co-acting together and in combination with the bushings 13, is that the bushings will not only be fed downwardly engaging the thread of the bolt more tightly at each revolution, but that the wedging action of extensions 4 will tend to firmly bind all of the parts tightly together against movement.

When thus assembled and applied, the nuts may be screwed down until they have been turned to the desired tension, whereupon the bushings will firmly grasp the bolt and at the same time hold the nuts in position. Independent supplemental adjustment may be made by either nut if desired, and when thus assembled and tightened the complete device will act to securely hold together any parts of mechanism to which it is applied by means of the bolt, and disengagement or loosening will be absolutely prevented. Should for any reason the parts become loose as by lengthening of the bolt or from any other causes, the device may be readily adjusted by merely turning the nut to take up wear.

As thus constructed the complete device constitutes a strong, efficient and durable locking nut having great strength and continuous holding power. It may be used in various adaptations and may be changed or varied in different details of construction or design, or in other features by the skilled mechanic, but all such changes are to be considered as within the scope of the following claims.

What I claim is:

1. In a self-fastening locking nut, the combination of two interfitting nuts, one of said nuts having an interior threaded wall and an exterior tapered wall, the other of said nuts having oppositely arranged interior tapered walls, and a plurality of exteriorly tapered bushings having exterior and interior threads, and means whereby one of said nuts will engage and turn the bushings, substantially as set forth.

2. In a self-fastening locking nut, the combination of a lower nut having an upwardly projecting tapered annular extension and interior threads, an upper nut having a tapered interior, and bushings having exterior and interior threads, said bushings being in turning engagement with the upper one of said nuts, substantially as set forth.

3. In a self-fastening locking nut, the combination of a lower nut having an upwardly projecting tapered annular extension and interior threads, an upper nut having an oppositely tapered interior and shouldered recesses, and bushings within said nuts having exterior tapered and threaded faces, interior threads, and lugs engaging said shouldered recesses, substantially as set forth.

4. In a self-fastening locking nut, the combination of a lower nut having an upwardly projecting divided series of annularly arranged tapered extensions and interior threads, an upper nut having oppositely flaring interior faces, means for engaging the bushings, and internally threaded bushings having exteriorly tapered and threaded walls engaging said nuts and provided with turning lugs arranged to engage said engaging means, substantially as set forth.

5. In a self-fastening locking nut, the combination of a lower nut having an upwardly projecting divided series of annularly arranged tapered extensions and interior threads, an upper nut having oppositely flaring interior faces, means for engaging the bushings, and internally threaded bushings having exteriorly tapered and threaded walls engaging said nuts and provided with turning lugs arranged to engage said engaging means, with means for preventing longitudinal disengagement of the bushings from the nut, substantially as set forth.

In testimony whereof I affix my signature in presence of two witnesses.

ANDREW V. BRYCE.

Witnesses:
GEO. B. BLEMING,
C. M. CLARKE.